United States Patent [19]

Flynn, Jr. et al.

[11] 4,285,912
[45] Aug. 25, 1981

[54] RECOVERY OF BISMUTH FROM CHLORIDE PROCESS SOLUTIONS

[75] Inventors: Charles M. Flynn, Jr., Reno; Thomas G. Carnahan, Sparks; Roald E. Lindstrom, Reno, all of Nev.

[73] Assignee: The United States of America as represented by the Secretary of the Interior, Washington, D.C.

[21] Appl. No.: 186,090

[22] Filed: Sep. 11, 1980

[51] Int. Cl.$^3$ .............................................. C01G 29/00
[52] U.S. Cl. ........................................ 423/43; 423/87
[58] Field of Search ..................................... 423/87, 43

[56] References Cited

PUBLICATIONS

Ephraim, Inorganic Chemistry, Sixth Edition, (1954), Interscience Publishers, Inc., pp. 335–337.

*Primary Examiner*—O. R. Vertiz
*Assistant Examiner*—Wayne A. Langel
*Attorney, Agent, or Firm*—William S. Brown; Donald A. Gardiner

[57] ABSTRACT

A method for the separation of bismuth from a complex chloride solution obtained by leaching with chloride reagents ores containing bismuth and high concentrations of other metals comprising adding to said complex chloride solution at least a stoichiometric amount of a precipitating agent selected from the group consisting of hexamminecobalt (III) salts and hexamminechromium (III) salts soluble in said solution to precipitate said bismuth as a hexamminecobalt (III) bismuth salt or a hexamminechromium (III) bismuth salt and separating said precipitate from said solution.

8 Claims, No Drawings

RECOVERY OF BISMUTH FROM CHLORIDE PROCESS SOLUTIONS

BACKGROUND OF THE INVENTION

This invention relates to a method for the separation of bismuth from chloride solutions containing high concentrations of other metals. More particularly, this invention relates to a method of separating bismuth from complex chloride solutions containing other metals using as precipitating agents hexamminecobalt (III) and hexamminechromium (III) salts.

Bismuth is a rare metal obtained as a by-product in copper, lead, and zinc production. The metal or its compounds are useful in low-melting alloys, thermoelectric devices, castings, magents, catalysts, medicines, and cosmetics.

Bismuth is commonly recovered from smelter flue dusts, anode slimes, and lead bullion by pyrometallurgical and hydrometallurgical techniques. With hydrometallurgical techniques, bismuth is the major component in solution and is readily recovered by hydrolytic precipitation, sulfide or carbonate precipitation, cementation, or electrolysis.

Recovery of bismuth by known techniques from the pregnant leach solutions of hydrometallurgical processes, however, is technically or economically infeasible. The pregnant solutions often contain high concentrations of Fe, Cu, Pb, or Zn, and low concentrations of bismuth, and the pH is usually maintained below 3.0 to prevent hydrolysis of solubilized metals in major concentrations. Therefore, separation of bismuth via hydrolytic precipitation of bismuth from leach solutions of hydrometallurgical processes by dilution with water or by precipitation by neutralization with bases is not feasible.

Leaching of Cu concentrates by ferrous chloride/oxygen solutions produces solutions having a pH of 1 to 2 containing $CuCl_2$ and $FeCl_2$ and solubilized bismuth. Although bismuth in such solutions could be precipitated as BiOCl by raising the pH to 3 or 4, this procedure fails to produce a pure Bi product because Cu(II) and Fe(II) react to form Cu(I) and Fe(III) oxide precipitate at pH above 2.5 with consumption of base. Sulfide precipitation of bismuth also fails in the presence of Cu(II) or Fe(III) because these metal ions oxidize sulfides.

Cementation or electrolysis of Bi in the presence of Cu or Fe(III) cannot be done because any reagent capable of reducing Bi(III) to Bi metal will reduce Fe(III) to Fe(II) and Cu(II) to Cu(I) or Cu metal.

It is an object of the invention to provide a method for the separation of bismuth from solutions containing same which avoids the aforementioned problems. In particular it is an object of the present invention to recover bismuth from solutions which contain as well high concentrations of other metal components that interfere with prior art bismuth recovery techniques.

SUMMARY OF THE INVENTION

These and other objects of the inventions are obtained by adding to a complex chloride solution obtained by leaching with chloride reagents ores containing bismuth and high concentrations of other metals at least a stoichimetric amount of a precipitating agent selected from the group consisting of hexamminecobalt (III) salts and hexamminechromium (III) salts soluble in said solution to precipitate the bismuth as a hexamminecobalt (III) bismuth salt or a hexamminechromium (III) bismuth salt and separating the precipitate from the solution. The separated hexamminecobalt (III) bismuth salt or hexamminechromium (III) bismuth salt may then be decomposed by reaction with a base or other suitable water-soluble salts to form the corresponding [Co$(NH_3)_6]^{+3}$ salt or [Cr $(NH_3)_6]^{+3}$ salt and an insoluble bismuth product.

DETAILED DESCRIPTION OF THE INVENTION

The complex solutions of metal chlorides treated in accordance with the present invention are obtained by the leaching of sulfide ore concentrates by ferrous chloride/oxygen, chlorine/oxygen, or ferric chloride. For example, the leaching of copper concentrates by ferrous chloride/oxygen typically produces complex chloride solutions containing over 20 g/l Cu and over 20 g/l Fe. These solutions contain the bismuth as an impurity, typically in concentrations of about 0.3 to 0.5 g/l. Other impurities such as Ni, Ag, Zn, Cd and Pb may also be present normally at concentrations of less than 2 g/l. In these solutions the chloride concentration is about 2 M or higher and consequently the bismuth is present as anionic chloro complexes. It has been found that hexamminecobalt (III) salts and hexamminechromium (III) salts soluble in the complex chloride solutions are very effective precipitants for the bismuth in the chloride solutions. In general the precipitation reaction employing these precipitating agents is capable of lowering the bismuth concentrations to 50 mg/l or less. Thus the method of the invention enables the separation of bismuth from high concentrations of metals which form weaker chloride complexes such as Mn, Fe, Co, Ni, Cu, Zn and light metals.

The amount of the precipitating agent of the invention added to the chloride solution is one to 1.5 times the stoichiometric amount. If an excess of the hexamminecobalt (III) salt or hexamminechromium (III) salt is employed for the precipitation, some copper is precipitated as a complex salt by the excess reagent. Any copper present in the bismuth product can be separated by treatment with ammonia. The preferred precipitating agent salts of the invention are hexamminecobalt (III) chloride or hexamminechromium (III) chloride. The stoichiometric requirements are 1.280 g [Co$(NH_3)_6]Cl_3$ or 1.247 g [Cr$(NH_3)_6]Cl_3$ per gram of Bi. The preferred amount of the precipitating agent is 110–120 percent of stoichiometric in which case roughly 40 mg/l Bi will remain in solution, when the Cu concentration is approximately 25 g/l and the Fe concentration approximately 90 g/l. In such cases much of the excess hexamminecobalt (III) salt or hexamminechromium (III) salt precipitates out as a complex copper salt.

The temperature at which the precipitation is conducted may range from about 0° to 120° C., with about 10° to 40° C. being preferred. The pH of the complex chloride solutions ranges from about 0.5 to 2.5 and is usually about 1 to 2. The precipitation can be carried out under atmospheric pressure but elevated pressure can be employed if desired.

The bismuth precipiate, i.e., hexamminecobalt (III) bismuth salt or hexamminechromium (III) bismuth salt, can be separated from the chloride solution by any suitable method such as by filtration or centrifugation. Where the precipitating agent is the chloride, i.e., [Co$(NH_3)_6]Cl_3$ or [Cr$(NH_3)_6]Cl_3$ the bismuth will precipitate as [Co(NH$_3$)$_6$]BiCl$_6$ and [Cr(NH$_3$)$_6$]BiCl$_6$. The precipitate may then be washed, preferably with an aqueous acidic chloride solution so as to reduce solubility losses and treated with a water-soluble base or salt to decompose the precipitate to the corresponding water-insoluble bismuth product and the water-soluble [M(NH$_3$)$_6$]$^{+3}$ salt wherein M is Co or Cr. This decomposition is generally conducted at a temperature of about 20°–130° C., preferably 60°–80° C. When the decomposition is effected using a water-soluble base the washed precipitate, e.g., [Co(NH$_3$)$_6$]BiCl$_6$ is slurried in water and treated with lime, caustic soda, ammonia or any other soluble base capable of effecting the conversions:

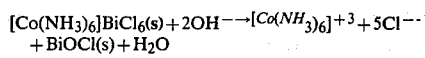

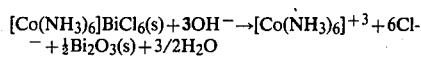

Alternatively, the decomposition of the precipitate may be effected using other water-soluble salts, such as carbonates, phosphates, silicates or borates capable of decomposing [Co(NH$_3$)$_6$]Bi salts and [Cr(NH$_3$)$_6$]Bi salts to an insoluble bismuth product and soluble [Co(NH$_3$)$_6$]$^{+3}$ salts and/or [Cr(NH$_3$)$_6$]$^{+3}$ salts, respectively.

If copper is present in the insoluble bismuth product obtained after decomposition, the copper can be dissolved by adding ammonium hydroxide.

The following examples are included to further illustrate the present invention.

EXAMPLE I

One liter of chloride leach solution containing, in g/l, Cu, 25; Fe, 90; Zn, 2; Pb, 0.6; and Bi, 0.37; and having a pH of 2 and a temperature of 20° C. was treated with 0.55 g of [Co(NH$_3$)$_6$]Cl$_3$ predissolved in 15 ml of water. Precipitation of [Co(NH$_3$)$_6$]BiCl$_6$ occurred immediately. The mixture was stirred slowly for ½ hour to flocculate the precipitate. This salmon-pink to orange precipitate of [Co(NH$_3$)$_6$]BiCl$_6$ was then centrifuged, washed with 3 pct aqueous HCl, slurried in water, and treated with lime to a pH of 10-11. The resulting mixture was centrifuged to recover solid Bi$_2$O$_3$ and [Co(NH$_3$)$_6$]Cl$_3$·CaCl$_2$ solution. The treatment of the Bi$_2$O$_3$ precipitate with aqueous ammonia causes dissolution of any copper that is present. The bismuth recovery was about 90 pct, with 37 mg/l Bi remaining in the copper-iron chloride pregnant solution. Recovery of [Co(NH$_3$)$_6$]Cl$_3$ was about 85 pct. The amount of Cu precipitated was about 0.03 g Cu/g Bi.

EXAMPLE II

Similar results are obtained by substituting as the precipitating agent in Example I [Cr(NH$_3$)$_6$]Cl$_3$ for the [Co(NH$_3$)$_6$]Cl$_3$. In this case all operations should be conducted at temperatures below 25° C. and in dim light because the hexamminechromium (III) complex ion is subject to thermal and photochemical decomposition.

It is claimed:

1. A method for the separation of bismuth from a complex chloride solution having a pH of about 0.5 to 2.5, and obtained by leaching with chloride reagents ores containing bismuth and high concentrations of other metals, said solution comprising over 20 g/l copper, over 20 g/l iron and about 0.3 to 0.5 g/l bismuth, said method comprising adding to said complex chloride solution at least a stoichiometric amount of a precipitating agent selected from the group consisting of hexamminecobalt (III) salts and hexamminechromium (III) salts soluble in said solution to precipitate said bismuth as a hexamminecobalt (III) bismuth salt or a hexamminechromium (III) bismuth salt and separating said precipitate from said solution.

2. A method according to claim 1 wherein the precipitating agent is hexamminecobalt (III) halide.

3. A method according to claim 2 wherein the hexamminecobalt (III) halide is hexamminecobalt (III) chloride.

4. A method according to claim 1 wherein the precipitating agent is hexamminechromium (III) halide.

5. A method according to claim 4 wherein the hexamminechromium (III) halide is hexamminechromium (III) chloride.

6. A method according to claim 1 wherein the precipitation is conducted at the temperature of about 0° to 120° C.

7. A method according to claim 1 wherein the hexaminecobalt (III) bismuth salt or hexamminechromium (III) bismuth salt is decomposed by reaction with a base or water-soluble salt to form the corresponding water-insoluble bismuth product and water-soluble [M(NH$_3$)$_6$]$^{+3}$ salt wherein M is Co or Cr.

8. A method according to claim 1 wherein the separated bismuth precipitate is slurried in water and treated with a water-soluble base to convert the precipitate to Bi$_2$O$_3$ and a water-soluble [M(NH$_3$)$_6$]$^{+3}$ salt wherein M is Co or Cr.

* * * * *